United States Patent [19]

Nakamura

[11] Patent Number: 4,846,659
[45] Date of Patent: Jul. 11, 1989

[54] ROTATIONAL SCREW FOR MIXING

[76] Inventor: Kensaku Nakamura, 272-1, Bessho-cho, Matsubara-shi, Osaka, Japan

[21] Appl. No.: 178,378

[22] Filed: Apr. 6, 1988

[51] Int. Cl.⁴ .............................................. B29C 47/60
[52] U.S. Cl. ...................................... 425/208; 366/324
[58] Field of Search ................ 425/204, 205, 208, 4 R, 425/376.1, 378.1; 366/80–82, 84, 86, 90, 319, 324, 88; 422/133, 137, 138; 264/211.21

[56] References Cited

U.S. PATENT DOCUMENTS

| | | | |
|---|---|---|---|
| 2,680,879 | 6/1954 | Schnuck et al. | 366/90 |
| 3,486,192 | 12/1969 | LeRoy | 366/82 |
| 3,687,423 | 8/1972 | Koch et al. | 425/208 X |
| 3,788,612 | 1/1974 | Dray | 366/81 |
| 3,788,614 | 1/1974 | Gregory | 366/88 X |
| 3,814,779 | 6/1974 | Wiley | 425/208 X |
| 3,826,477 | 7/1974 | Kunogi et al. | 425/208 X |
| 3,957,256 | 5/1976 | Murakami | 366/81 |
| 4,107,788 | 8/1978 | Anders | 366/81 |
| 4,639,143 | 1/1987 | Frankland Jr. | 366/90 X |

FOREIGN PATENT DOCUMENTS

| | | | |
|---|---|---|---|
| 2854650 | 6/1980 | Fed. Rep. of Germany | 425/376.1 |
| 5381567 | 7/1978 | Japan | 366/81 |
| 5820785 | 4/1983 | Japan | 425/208 |

Primary Examiner—Richard L. Chiesa
Attorney, Agent, or Firm—Moonray Kojima

[57] ABSTRACT

A rotational screw for mixing synthetic resins with various additives, comprising a plurality of helically arranged mixing recesses provided consecutively, at specified mixing positions, in the peripheral areas thereof and communicated transversely of the helical direction with one another so that the amount of delivered material is large and highly intimate mixing is effected. The improvement comprises a plurality of helically arranged recesses which are triangular in helical cross section, and are arranged to have their corresponding tips of adjacent recesses at 60° angles from each other.

6 Claims, 3 Drawing Sheets

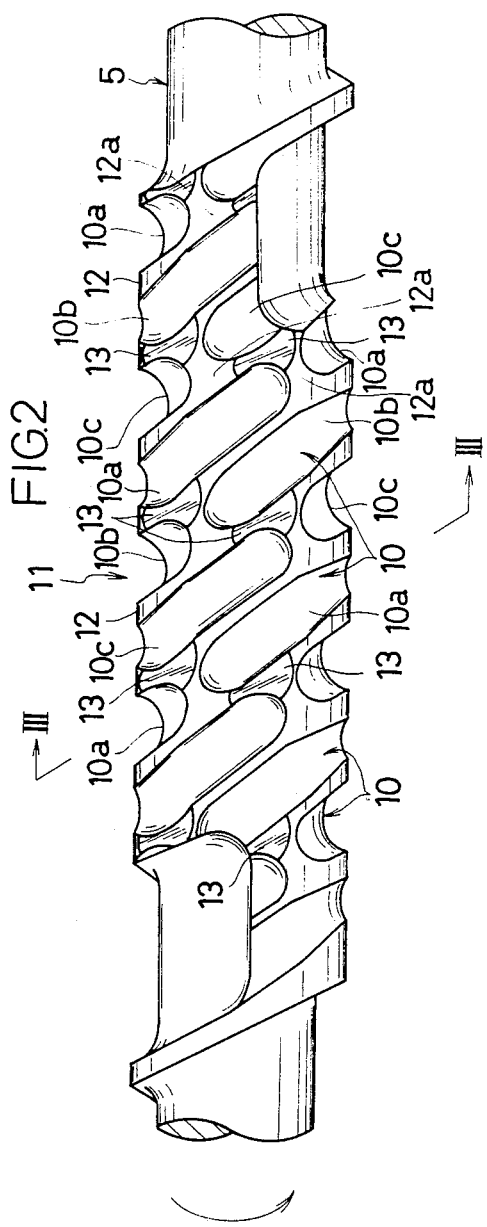
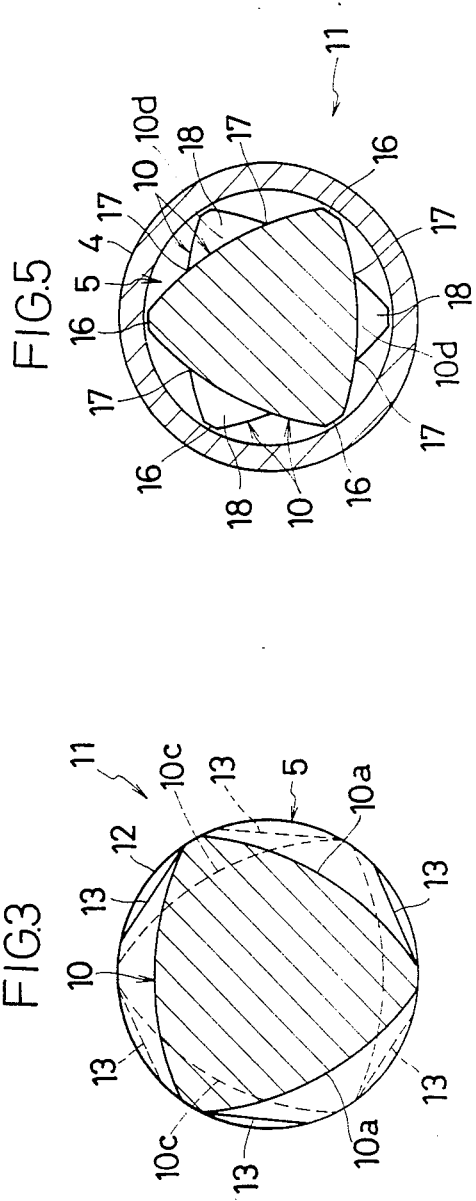

ROTATIONAL SCREW FOR MIXING

SUMMARY OF THE INVENTION

The present invention relates to a rotational screw for mixing, for use with an extruder for forming by forcing out a volume of molten synthetic resin or a mixture of synthetic resin with additives including glass or carbon fiber, calcium carbonate, etc., with the screw having a multiplicity of helically arranged mixing recesses provided consecutively, at specified mixing positions, in the periphery thereof and communicated transversely of the helical direction with one another so that the amount of mixed material is large and highly intimate mixing can be effected.

BACKGROUND OF THE INVENTION

There are prior art rotational screws for mixing. For example, a barrier type is disclosed in U.S. Pat. No. 3,486,192 (see FIG. 6) and a dam-flight type is disclosed in Japanese Unexamined Patent Publication No. 11505/1967 (See FIG. 7).

The barrier type screw 60, in FIG. 6, has a mixing portion 62 thereof which is equal to flight portions thereof in diameter and provided on the central region of a screw shaft 61. On the periphery of the mixing portion 62 there are a plurality of axially extending mixing recesses 63. In operation with this barrier type screw 60, while material supplied into the mixing recesses 63 is transported in the axial direction as the screw shaft 61 rotates, a portion of material moves in a direction opposite to the rotating direction of the screw shaft 61 and will flow into the nearest recess 63 situated in a circumferential direction. This causes the material to flow disorderly in two directions on the mixing portion 62 to thereby prevent uniform mixing with additives.

The dam-flight type screw 70, in FIG. 7, has a lead of main flight 72 disposed on a screw shaft 71 thereof and also, a lead of auxiliary flight 73 having a large pitch. In addition, a mixing portion 74 of the screw 70 is formed such that the distance between the flights 72 and 73 becomes narrow in the feeding direction. Thus, as the screw shaft 71 rotates, a portion of material moves across the auxiliary flight 73 and is joined with the flow of material moving along the back side of the auxiliary flight 73. However, this action does not result in continuous and appropriate mixing of the material; rather, it results only in agitation of the same with both of the flights 72 and 73. Thus, it is difficult for the arrangement to provide a uniform mixture of material constantly by intimately mixing the material with additives.

OBJECT OF THE INVENTION

It is a primary object of the present invention to provide a rotational screw for mixing which has a multiplicity of helically arranged mixing recesses provided consecutively, at specified mixing positions, in the periphery thereof so that molten resin material which is to be mixed can be agitated positively and commingled uniformly for highly intimate mixing and additionally, the amount of material which is large.

It is another object of the present invention to provide a rotational screw for mixing in which the helically arranged mixing recesses are fluidly communicated with one another along a flow path while there are narrow land portions remaining, each of which being situated between the axially consecutive recesses so that the constructive strength of a mixing portion thereof is increased.

It is a further object of the present invention to provide a rotational screw for mixing in which the axially consecutive mixing recesses are proximate to one another so that a plurality of communicating paths can be provided at the equally leveled surfaces in the mixing recesses, each of the paths being situated between the axially consecutive mixing recesses, whereby, the multiplicity of paths will be formed simultaneously when the mixing recesses are formed in proximate relationship to one another thus to minimize the procedures of making the same and additionally, the effect of mixing movement by separation and agitation is improved while the amount of material delivered also is increased.

Other objects of the present invention will be apparent from the following description of preferred embodiments.

BRIEF DESCRIPTION OF THE INVENTION

The drawings illustrate preferred embodiments according to the present invention, in which:

FIG. 2 is an enlarged side view of the main part of a rotational screw;

FIG. 3 is a cross sectional view taken on the line III—III of FIG. 2;

FIG. 5 is a cross sectional view taken on the line V—V of FIG. 4;

EMBODIMENT

Preferred embodiments of the present invention will be described in detail in conjunction with the drawings.

First Embodiment

Figure 1:
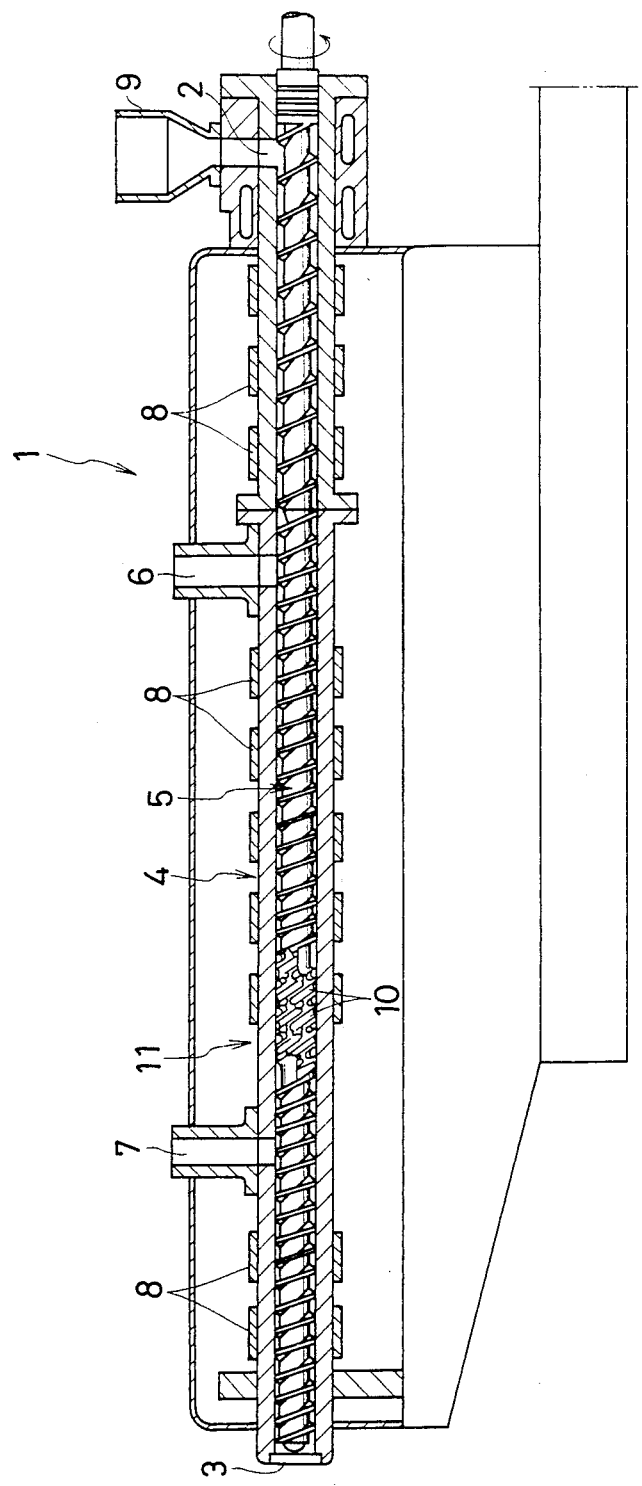
FIG. 1 is a longitudinal sectional side view of an extruder.

Each of the drawings illustrates a rotational screw for mixing such as employed in an extruder for shaping a mixture of granular ABS resin with additives including glass fiber by extrusion forming. As shown in FIG. 1, an extruder 1 comprises a heating cylinder 4 having at one end a feeder inlet 2 for feeding material and at the other end an extruder outlet 3 and a rotational screw 5 mounted within the heating cylinder 4 for transporting material supplied into the cylinder 4 from the feeder inlet 2 to the extruder outlet 3.

The heating cylinder 4 has a first vent opening 6 and second vent opening 7 provided thereon for deaeration and a plurality of band heaters 8 mounted on the periphery thereof, as shown in FIG. 1.

The feeder inlet 2 is communicated with a material supplying hopper 9 disposed thereabove, whereby a determined amount of granular material supplied into the hopper 9 flows downward through the inlet 2 into the heating cylinder 4.

The rotational screw 4 has a multiplicity of helically arranged mixing recesses 10 provided consecutively in the periphery thereof on the inlet 2 side of and adjacent to the second vent opening 7 so as to form a mixing portion 11 for mixing of material.

As shown more clearly in FIGS. 2 and 3, each of the mixing recesses 10 is of oblong shape having arcuate ends and oriented helically on the periphery of the rotational screw 5 so as to extend to a length through an angle of about 110 degrees. Particularly, the mixing recesses 10 are formed such that a group of three axially consecutive recesses 10a, 10b, and 10c are arranged in the periphery of the rotational screw 5 at angular intervals of about 60 degrees while a partition portion 12a is provided between each two of the helically consecutive recesses 10a, 10a.

Furthermore, the mixing recess 10 becomes deeper gradually toward its helically central region where its depth is maximum thus to have a helically sloping smooth bottom (see FIG. 3).

In addition, there are narrow land portions 12 remaining respectively between the consecutive recesses 10a, 10b, and 10c thus to serve as flowable portions which allow the material to flow thereacross transversely of the helical direction and also, the consecutive recesses 10a, 10b, and 10c are fluidly communicated with each other by flow paths 13 (See FIGS. 2, 3)..

The operation of processing a mixture of granular ABS resin with additives including glass fiber by the extruder 1 having such an arrangement is as follows:

As shown in FIG. 1, a specified amount of mixed material which has been supplied into the hopper 9, flows downward into the heating cylinder 4 and is then transported continuously toward the extruder outlet 3 as the rotational screw 5 rotates in a direction such as represented by the arrow.

During the transferring of material to the extruder outlet 3, the material is heated by the band heaters 8 and comes into a molten state. After deaeration through the first vent opening 6, the material reaches the mixing portion 11 of the rotational screw 5 disposed in the rear of the same. The molten material is further transported as passing through the mixing recesses 10 of the mixing portion 11 (see FIG. 2) where the flow of material will become turbulent in pulsating movement and, more specifically, will be divided leftward and rightward into a number of streams upon moving along the flow paths 13 and then joined while passing through the recesses 10a, 10b, and 10c and additionally, portions of the material flow will pass across the partition portions 12a fluidly communicated with the rear portions of recess thus to move separately into the adjacent recesses situated transversely of the helical direction. This allows the mixture of material to be agitated and commingled continuously. Consequently, the material of molten resin mixed with additives can be commingled positively, uniformly, and effectively by a series of movement and after deaeration through the second vent opening 7, will be discharged continuously through the extruder outlet 3 for extrusion forming.

As set forth above, the rotational screw 5 incorporates the mixing portion 11 having the multiplicity of mixing recesses 10 on its periphery, whereby the flow of material becomes turbulent in pulsating movement upon passing the mixing portion 11 while portions thereof move transversely of the helical direction across the consecutively arranged recesses 10a, 10b, and 10c. This movement of flow causes the material to be positively agitated and uniformly commingled, which results in a highly effective mixing operation.

Additionally, the material is effectively heated during mixing as being constantly transported through the heating cylinder 4 by the rotational screw 5 and thus, will become molten and form an intimate mixture of material which is then discharged through the extruder outlet 3.

Furthermore, the narrow land portions 12 which are disposed respectively between the consecutive recesses 10a, 10b, and 10c, improves the constructive strength of the mixing portion 11.

It will be understood that the width and length of each of the recesses 10a, 10b, and 10c can be (i.e. changed) depending on the degree of mixture of granular material as well as the axial length of the mixing portion 11 in relation to the rotational screw 5.

Second Embodiment

Figure 4:
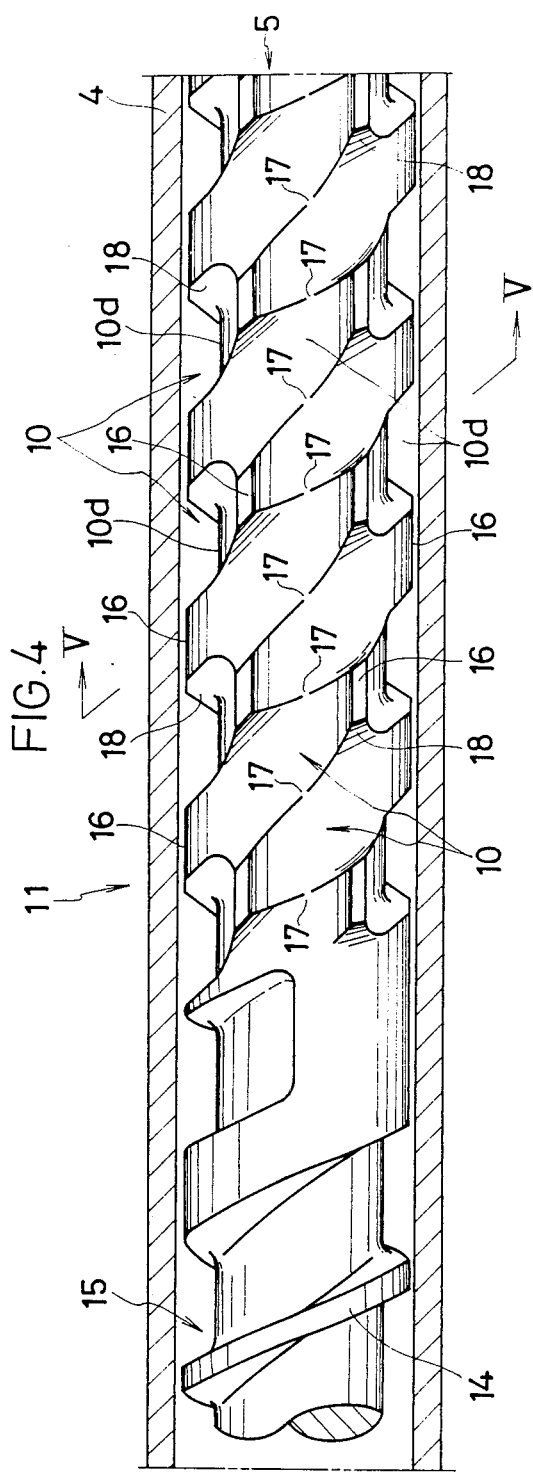
FIG. 4 is a side view showing a further embodiment in the form of a rotational screw.
Figure 6:
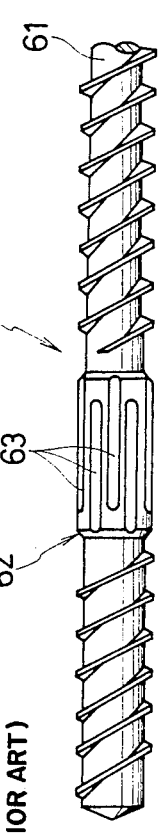
FIG. 6 is an explanatory view of a prior art barrier type screw.
Figure 7:
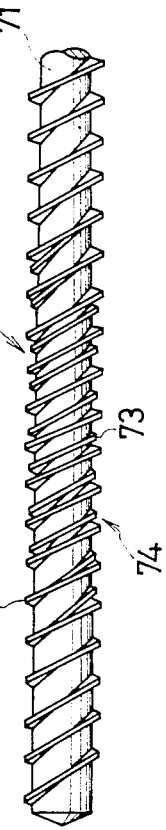
FIG. 7 is an explanatory view of a prior art dam-flight type screw.

FIGS. 4 and 5 illustrate another embodiment of a rotational screw for mixing.

This rotational screw 5 comprises a mixing portion 11 and screw portions 15 provided respectively on both transporting front and rear ends of the mixing portion 11, each having a flight 14 (not shown on right for simplification of drawing).

The mixing portion 11 has a plurality of projections 16 provided helically on the periphery thereof, for example, at angular intervals of 120 degrees (see FIG. 5). Similarly, there are a multiplicity of mixing recesss 10 provided consecutively in the helical direction, each having the shape of an abbreviate parallelogram in axial projection (see FIG. 4) and formed between the two helically consecutive projections 16, 16 so as to become greater in depth gradually toward its central region (see FIG. 5), intermediate of the two projections 16, 16 where the depth (vis-a vis the outer periphery) is maximum.

Each of the projections 16 is axially situated beside the central deepest region of the adjacent recess 10d as the helicoid involves a phase angle of 60 degrees, so that the projections 16 can project from the periphery of a screw shaft at angular intervals of 60 degrees (i.e. projection 16 of one recess is 60° from the next adjacent projection 16 of the next adjacent recess).

Accordingly, the recesses 10d are also arranged at angular intervals of 60 degrees so that a plurality of communicating paths 17 can be formed along the equally leveled surfaces in the consecutive recesses 10d as situated 30 degrees from the projection 16 (see FIG. 5) while a side wall 18 of each projection 16 acts as a guiding surface.

More particularly, the rotational screw 5 shown in FIGS. 4 and 5 incorporates the communicating paths 17 in a no-land arrangement, each of which is provided between the recesses 10d, 10d by communicating the same proximately with each other.

In operation with this rotational screw 5, a mixture of ABS resin with glass fiber is continuously transported along the guiding surfaces of the side walls 18 of the projections 16 for extrusion forming, while being melted on the mixing portion 11.

During the transportation, a compressing force is applied for grinding the material by means of a combination of the projections 16 and thus, the flow of material is extensively separated axially in the recesses 10d while portions of the material flow move through the communicating paths 17 between the recesses 10d, 10d into the adjacent recesses 10d thus to become turbulent in pulsating movement.

Thus, the material becomes to a uniform mixture of material through a complete, combined operation of separation, agitation, and mixing before reaching the exit of the mixing portion 11 and then, is discharged through the screw portion 15 disposed next to the mixing portion 11.

As set forth above, in view of the fact that in the mixing portion of the invention, the flight lands (screw threads) of the conventional screw are eliminated while regularly arranged projections and recesses are provided helically on the periphery of the screw, it is possible with the invention to increase the amount of material mixture which is delivered and additionally, to improve the effect of separation, agitation, and mixing.

Moreover, the communicating paths 17 are provided simultaneously, as the mixing recesses 10, and are communicated with one another in proximate relationship, so that the procedures of making a mixing screw are advantageously minimized.

The rotational screw of the present invention may be employed, in addition to the just described mixing of common synthetic resin with additives, for mixing other resin materials which need to be commingled intimately and to deliver a large amount of mixed material.

The outer periphery of the screw rod has a plurality of helically arranged recesses which form of the remainder of the radial part of the rod a plurality of triangles in helical cross section each having three tips and three rounded sides which are arranged to have their corresponding tips of remaining radial rod parts formed by adjacent recesses at 60° angles from each other as shown in FIGS. 3 and 5.

Like numerals in FIGS. 4 and 5 refer to like members in the other drawings.

I claim:

1. A rotary mixing screw comprising
a circular cylindrical solid rod having on the outer periphery thereof
a plurality of first recesses arranged substantially parallel to each other and substantially helically about an axis of the rod, said first recesses forming of the remaining radial part of said rod a plurality of triangles each having three tips and three rounded sides, each triangular remaining radial part of said rod formed by said first recesses being disposed to have its corresponding tip located at a 60° angle from the corresponding tip of the triangular remaining radial part of said rod formed by the next adjacent said first recesses, said triangles being formed of said remaining radial part of said rod when considered from a helical cross section;
wherein said outer periphery of said rod has remaining circumferential portions remaining between said first recesses; and
a plurality of second recesses formed axially on the outer periphery and in the remaining circumferential portions and connecting adjacent first recesses.

2. The screw of claim 1, wherein said tips are of a radius the same as the radius of the outer periphery of said rod.

3. The screw of claim 1, wherein said tips are of a radius smaller than the radius of the outer periphery of said rod.

4. A rotary mixing screw comprising
a circular cylindrical solid rod having on the outer periphery thereof
a plurality of first recesses cut in said outer periphery of said rod and arranged substantially parallel to each other and substantially helically about an axis of the rod, said first recesses forming of the remaining radial part of said rod a plurality of triangles each having three tips and three rounded sides, each triangular remaining radial part of said rod formed by said first recesses being disposed to have its corresponding tip located at a 60° angle from the corresponding tip of the triangular remaining radial part of said rod formed by the next adjacent said first recesses, said triangles being formed of said remaining radial part of said rod when considered from a helical cross section; and
a plurality of second recesses cut in said outer periphery of said rod disposed axially and connecting adjacent first recesses and located at a 30° angle from the next adjacent second recess.

5. The screw of claim 4, wherein said tips are of a radius the same as the radius of the outer periphery of said rod.

6. The screw of claim 4, wherein said tips are of a radius smaller than the radius of the outer periphery of said rod.

* * * * *